United States Patent [19]
Pace et al.

[11] Patent Number: 6,031,879
[45] Date of Patent: Feb. 29, 2000

[54] WIDEBAND UNDERSAMPLING DIGITAL RECEIVER

[75] Inventors: Phillip E. Pace, Castroville, Calif.; Richard E. Leino, Quantico, Va.; David Styer, Cincinnati, Ohio

[73] Assignee: The United States of America as represented by the Secretary of the Navy, Washington, D.C.

[21] Appl. No.: 08/964,777

[22] Filed: Nov. 5, 1997

[51] Int. Cl.[7] .............................. H03K 9/00; H04L 27/06; H04L 27/14; H04L 27/22

[52] U.S. Cl. ......................... 375/316; 375/324; 375/325; 364/725.01; 364/726.03; 370/210; 324/76.21; 324/76.22

[58] Field of Search ..................................... 375/316, 325, 375/324; 364/725.01, 726.03; 370/210; 324/76.21, 76.22

[56] References Cited

U.S. PATENT DOCUMENTS

| | | | |
|---|---|---|---|
| 4,963,816 | 10/1990 | Tsui et al. | 324/76.35 |
| 5,099,194 | 3/1992 | Sanderson et al. | 324/76.47 |
| 5,122,732 | 6/1992 | Engeler et al. | 324/76.31 |
| 5,293,114 | 3/1994 | McCormick et al. | 324/76.22 |
| 5,323,103 | 6/1994 | Choate et al. | 324/76.22 |

OTHER PUBLICATIONS

W. McCormick, J. B. Y. Tsui, V. L. Bakke, "A Noise INsensitive Solution to an Ambiguity Problem in Spectra Estimation," IEEE Transactions on Aerospace and Electronic Systems, Sep. 1989, vol. 25, No. 5, pp. 729–732, Sep. 1989.

W. McCormick, D. F. Miller, J. B. Y. Tsui, "Resolution of a 2–Pi Ambiguity Problem in Multiple Frequency Spectral Estimation," IEEE Transactions on Aerospace and Electronic Systems, Sep. 1989, vol. 31, No. 1, pp. 2–8, Sep. 1989.

*Primary Examiner*—Stephen Chin
*Assistant Examiner*—Michael W. Maddox
*Attorney, Agent, or Firm*—Donald E. Lincoln

[57] ABSTRACT

An antenna receives an analog waveform and an analog signal indicative of the amplitude and frequency of the analog waveform. The analog signal is processed in a plurality of parallel digital processing channels each arranged to digitize the analog signal at a corresponding sampling frequency $f_{si}$ to produce a plurality of digital signals. A discrete Fourier transform is applied to each of the digital signals output to produce a corresponding plurality of unique Fourier spectra of length $m_i=(f_{si})(T_{Li})$ where $T_{Li}$ is the integration time for the discrete Fourier transform for each digital processing channel. The lengths of the Fourier spectra ($m_i$) are selected to be pairwise relatively prime. The discrete Fourier transform encodes the signals in same form as the symmetrical number system (SNS). A SNS-to-decimal algorithm is then applied to the detected bin values ($a_i$) to determine the numerical value of the frequency f of the analog waveform. The receiver resolves all undersampling ambiguities exactly, thereby relaxing the speed requirements on the digital section of the receiver.

6 Claims, 4 Drawing Sheets

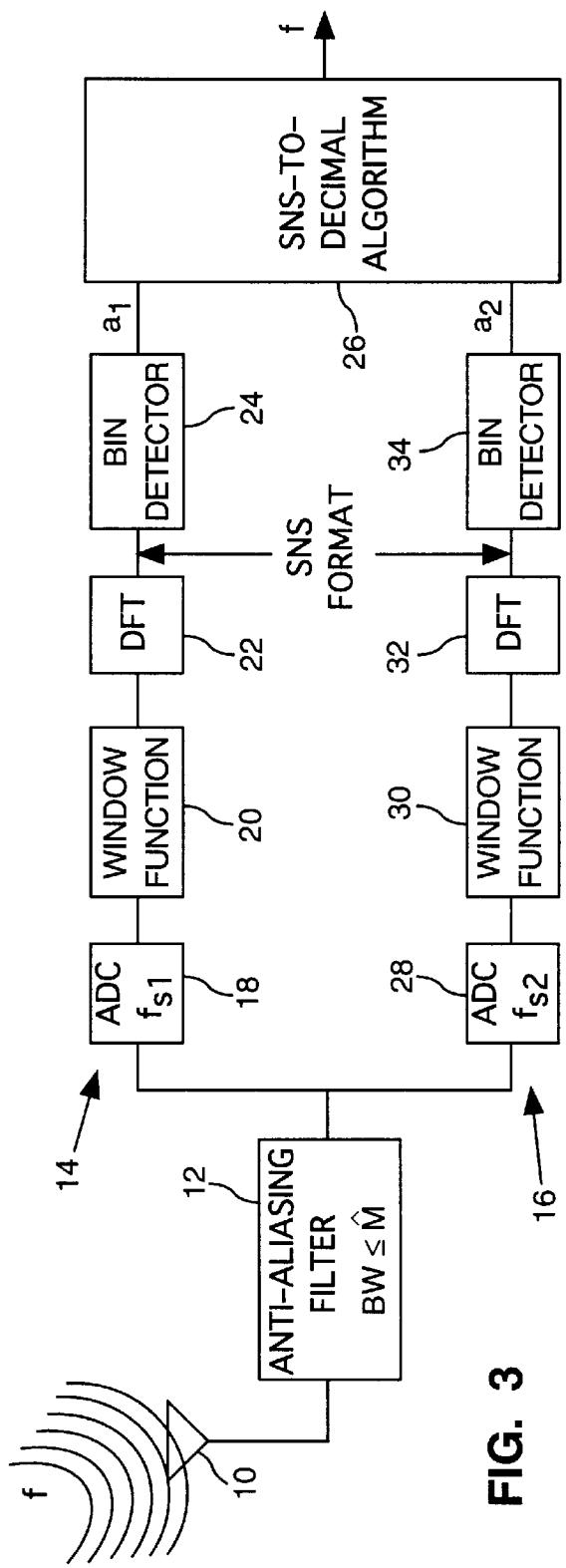
FIG. 3
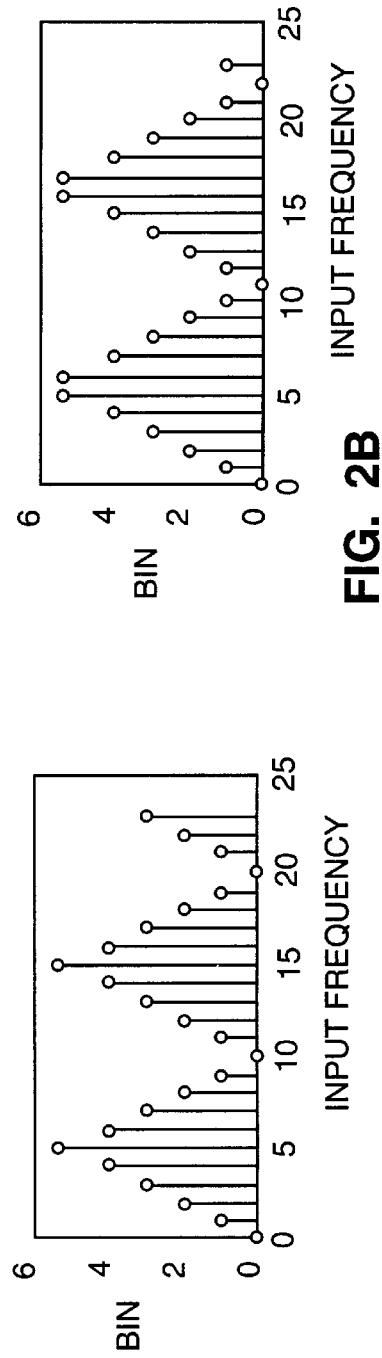
FIG. 2B
FIG. 2A

WIDEBAND UNDERSAMPLING DIGITAL RECEIVER

BACKGROUND OF THE INVENTION

1. Field of the Invention.

This invention relates generally to digital receivers and particularly to apparatus and methods for increasing the bandwidth of a conventional digital receiver to provide improved frequency detection.

2. Description of the Prior Art

Digital processing of a signal such as an electromagnetic wave begins with receiving the wave with an antenna and forming a corresponding analog electrical signal. The electrical signal is then digitized using an analog-to-digital converter (ADC), which samples the wave at a sampling frequency $f_s$ and forms a digital waveform using the magnitude of the analog waveform at each sampling time. The process of digitizing the signal is usually governed by the Nyquist criterion, where it is assumed that the input signal must be band limited such that $0 \leq f \leq f_s/2$ before going into the analog-to-digital converter (ADC). If the sampling frequency is less than twice the incoming signal frequency, then the analog waveform is undersampled. If the signal contains a frequency component higher than half the sampling frequency, aliasing occurs, which causes ambiguities in the analog-to-digital conversion process.

There are several advantages to an undersampled system. Among these are a reduction in the speed requirements on the digital section of the system, a relaxation on the analog antialiasing filter requirements, and the possibility of extending the capabilities of existing systems with relatively minor redesign. In addition, there are power and cost savings in the ADC section.

The main problem in identifying the frequencies present in an undersampled signal is the resolution of the ambiguities. The Nyquist theorem places a limitation only on the information that can be derived from a single set of digitized data. That is, a single set of digitized data limits subsequent analysis to an $f_s/2$ bandwidth unless there is additional information available. With additional information, the frequency components $f > f_s/2$, which appear ambiguously due to undersampling, may be resolved. A prior undersampling technique uses a set of trial sampling periods to recover periodic signals by reconstructing the waveform. The trial period that yields the waveform of smallest variation is then considered to be the correct period and the resulting waveform the correct waveform. To come more in line with real-time wideband processing, other methods based on the use of phase shift information to resolve the ambiguities in a single frequency undersampled signal have also been investigated. These procedures are complex and resolve only small ranges of ambiguities.

SUMMARY OF THE INVENTION

This invention provides a method for digitally processing a signal derived from an analog waveform of frequency f to determine the numerical value of the frequency. The method according to the present invention comprising the steps of (a) receiving the analog waveform with a receiving antenna to produce an analog signal indicative of the amplitude and frequency of the analog waveform; (b) processing the analog signal in a plurality of parallel digital processing channels each arranged to digitize the analog signal at a corresponding sampling frequency $f_{si}$ to produce a plurality of digital signals; (c) applying a Fourier transform to each of the digital signals output to produce a corresponding plurality of unique Fourier spectra of length $m_i = (f_{si})(T_{Li})$ where $T_{Li}$ is the integration time for the Fourier transform for each digital processing channel; (d) detecting the frequency bin ($a_i$) within each discrete Fourier transform output; and (e) applying an algorithm to the collection of bin numbers from the digital processing channels to determine the numerical value of the frequency f.

The method preferably further includes the step of applying a low-pass filter to the analog waveform before the analog waveform is processed by the plurality of parallel digital processing channels.

The method preferably further also includes the step of applying a window function to the digitized signals in each channel to reduce the Gibb's oscillations.

The discrete Fourier transform for the $i^{th}$ digital channel is a transformation of a plurality of $m_i$ time-domain samples of a waveform $x(n)$ to a sequence of $m_i$ frequency domain coefficients defined by $$X_i(k) = \sum_{n=0}^{m_i-1} x(n) e^{-j(2\pi nk/m_i)} \qquad k = 0, \ldots, m_i - 1$$

and where $|X_i(k)|^2$ is the energy contained in the signal at each digital frequency $\omega = 2\pi k/m_i$. The sampling frequencies and sampling times are preferably selected such that the time-bandwidth products $(f_{si})(T_{Li})$ for the plurality of digital channels is a set of pairwise relatively prime numbers, which encodes the digitized signals in the Fourier output in the form of the symmetrical number system (SNS).

The method of the present invention also includes natural arrangement of the signal bins at the output of the discrete Fourier spectrum in each of the plurality of parallel digital processing channels defined by $$\left[0, 1, \ldots, \frac{m_i}{2}, \frac{m_i}{2} - 1, \ldots, 2, 1\right] \quad \text{for } m_i \text{ even, and}$$

$$\left[0, 1, \ldots, \left\lfloor \frac{m_i}{2} \right\rfloor, \left\lfloor \frac{m_i}{2} \right\rfloor, \ldots, 2, 1\right] \quad \text{for } m_i \text{ odd; and}$$

detecting signals in the discrete Fourier spectra to identify which signal bin contains the most energy. A SNS-to-decimal algorithm is then used to find the frequency from the bin values.

An appreciation of the objectives of the present invention and a more complete understanding of its structure and method of operation may be had by studying the following description of the preferred embodiment and by referring to the accompanying drawings.

BRIEF DESCRIPTION OF THE DRAWINGS

FIG. 2A is a discrete Fourier transform mapping for a first sampling frequency;

FIG. 2B is a discrete Fourier transform mapping for a second sampling frequency;

FIG. 3 is a block diagram of a two-channel receiver architecture according to the present invention;

DESCRIPTION OF THE PREFERRED EMBODIMENT

I. Introduction

An undersampling digital receiver according to the present invention resolves single-frequency ambiguities exactly by parallel processing the received signal using $r \geq 2$ channels. The invention uses the ability of the discrete Fourier transform (DFT) to encode the frequency information in a signal in a format that is in the same form as the symmetrical number system (SNS). An example of a configuration for a single channel comprises an analog-to-digital converter (ADC), a DFT processor, and means for accurately detecting the input DFT frequency bin of the signal. The time-bandwidth product of each channel is $m_i = f_{si} T_{Li}$ where $f_{si}$ is the sampling frequency and $T_{Li}$ is the DFT integration time. That is, $m_i$ is the number of time samples integrated by each DFT, (number of frequency bins in the DFT output). In the receiver design, the value of $m_i$ for each channel, is an SNS modulus. The design is such that the $r$ values of $m_i$ must be pairwise relatively prime. The frequency ambiguities are resolved after the $r$ different channels are used, and the bin values from each channel are recombined. By incorporating the SNS-DFT relationship in the receiver design, the ambiguities can be resolved exactly and the requirements on each ADC section of the receiver may be relaxed.

II. DFT and SNS Relationship

Consider a single-frequency signal sampled at two different sampling frequencies. Digital uniform sampling of an analog waveform with frequency f produces a discrete spectrum that is symmetrical about the sampling frequency $f_s/2$. Assume for this system that the two sampling frequencies are $f_{S1}=10$ and $f_{S2}=11$. After sampling, an analog input signal x(t) becomes a discrete sequence x(nT). This periodic sequence has a digital frequency given by $\omega=2\pi(f/f_s)$. A signal with digital frequency $0 \leq \omega \leq \pi$ is indistinguishable from a signal with digital frequency $n\pi \leq \omega \leq (n+1)\pi$, $n=1, 2, 3, \ldots$, which is an effect known as aliasing.

Figure 1A:
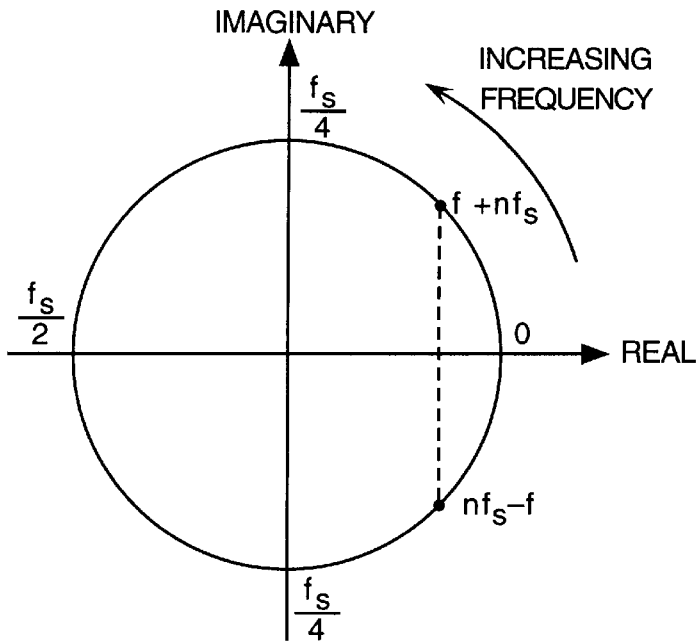
FIG. 1A graphically illustrates a Z-plane mapping of an analog signal that is input to a digital receiver.

The digital frequency of a sampled sinusoid can be mapped into the z-domain, as shown in FIG. 1(A). For simplicity, assume a sinusoid $x(t)=2 \cos 2\pi ft$, and after sampling $$x(n) = 2 \cos\omega n = e^{j\omega n} + e^{-j\omega n} \quad (1)$$

Figure 1B:
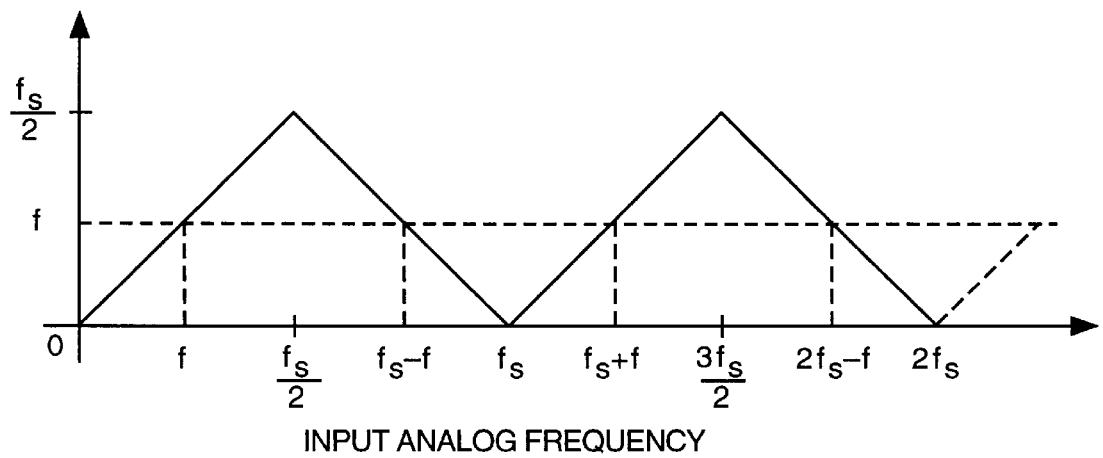
FIG. 1B graphically illustrates the sampled frequency output for the signal of FIG. 1A.

A frequency $f=f_s/4$ corresponds to $\omega=\pi/2$. If $f=f_s/2$, then $\omega=\pi$. Since the signal is real, the signal poles appear in complex conjugate pairs on the z-plane. Frequencies between $f_s/2$ and $f_s$ map back to their conjugate on the upper half of the complex plane. If the frequency is increased beyond $f_s$, a full trip is made around the unit circle, and the mapping repeats. FIG. 1(B) illustrates the mapping with each triangle representing a full rotation around the unit circle in the z-plane. The abscissa represents the input analog frequency, whereas the ordinate represents the digital frequency mapping. Note that an infinite number of analog frequencies will map into each digital frequency $0 \leq \omega \leq \pi$.

The DFT is given by $$X(k) = \sum_{n=0}^{N-1} x(n) e^{-j(2\pi nk/N)} \qquad k = 0, \ldots, N-1 \quad (2)$$

Application of the DFT to x(n) as defined by Eq. (2) yields a discrete spectrum, where $|X(k)|^2$ is the energy contained in the signal at each digital frequency $\omega=2\pi/N$. The discrete spectrum X(k) has N indices with the digital frequency of each index given by $$\left[0, 2\pi \frac{1}{N}, \ldots, 2\pi \frac{(N/2)}{N}, 2\pi \frac{(N/2+1)}{N}, \ldots, 2\pi \frac{(N-2)}{N}, 2\pi \frac{(N-1)}{N}\right] \quad (3)$$

for N even, and $$\left[0, 2\pi \frac{1}{N}, \ldots, 2\pi \frac{(N-1)/2}{N}, 2\pi \frac{(N+1)/2}{N}, \ldots, 2\pi \frac{(N-2)}{N}, 2\pi \frac{(N-1)}{N}\right] \quad (4)$$

for N odd.

The analog frequency corresponding to each index is obtained by multiplying each value by $f_s$. Because signals with digital frequencies in the range $\pi<\omega<2\pi$ are indistinguishable from signals with digital frequencies $0 \leq \omega \leq \pi$, the digital frequency of each index can also be written as $$\left[0, 2\pi \frac{1}{N}, \ldots, 2\pi \frac{(N/2)}{N}, 2\pi \frac{(N/2-1)}{N}, \ldots, 2\pi \frac{2}{N}, 2\pi \frac{1}{N}\right] \quad (5)$$

for N even, and $$\left[0, 2\pi \frac{1}{N}, \ldots, 2\pi \frac{\lfloor N/2 \rfloor}{N}, 2\pi \frac{\lfloor N/2 \rfloor}{N}, \ldots, 2\pi \frac{2}{N}, 2\pi \frac{1}{N}\right] \quad (6)$$

for N odd; where $\lfloor x \rfloor$ represents the greatest integer less than or equal to x. More simply, the spectrum X(k) resolves into N integer indices, and incoming signals will map into unique bins given by $$\left[0, 1, \ldots, \frac{N}{2}, \frac{N}{2}-1, \ldots, 2, 1\right] \quad (7)$$

for N even, and $$\left[0, 1, \ldots, \left\lfloor\frac{N}{2}\right\rfloor, \left\lfloor\frac{N}{2}\right\rfloor, \ldots, 2, 1\right] \quad (8)$$

for N odd. That is, because frequency indices greater than N/2 are redundant for real signals, the highest unbiased frequency that can be observed corresponds to the N/2 index. From the above discussion, it is clear that the DFT maps real signals naturally into the symmetrical number system. In this case, the modulus of each channel m is the number of indices N given by $N=f_S T_L$, where $T_L$ is the total integration time. That is, $m=f_S T_L$.

FIGS. 2A and 2B illustrate the DFT mapping for r=2 channels, where $f_{s1}=10$ and $f_{s2}=11$ for input frequencies f=0 to 23. In this case, $T_L=1$ so that $m_1=10$ and $m_2=11$. As discussed below, the r channel moduli $m_i = f_{si} T_{Li}$ are pairwise relatively prime. In FIGS. 2A and 2B, the abscissa corresponds to the incoming frequency, whereas the ordinate corresponds to the bin into which the signal is resolved. Table I displays the input frequency and the resulting DFT bin for each sampling frequency. Note that the frequencies resolve as described in Eqs. (7) and (8). By considering both channels, it is possible to unambiguously resolve signal frequencies in the dynamic range determined by the SNS ($0 \leq f \leq 15$).

III. The Symmetrical Number System

In the SNS preprocessing, r different periodic symmetrical waveforms are used with periods based on r different, pairwise relatively prime, integer lengths $m_1, m_2, \ldots, m_r$. For each integer k, an r-dimensional column vector $A_K$ is formed by placing the value of the ith waveform at k in the ith position $1 \leq i \leq r$. It is then desired to find out the largest set of vectors $A_0, A_1, \ldots, A_K$ that are distinct. This sequence of k+1 vectors forms the unambiguous output of the system. This number k+1 is called the dynamic range of the system.

The definition of the SNS waveform is given below.

Definition 1. Let m be an integer greater than 1. For an integer h such that $0 \leq h \leq m$, define $$a_h = \min\{h, m-h\} \quad (9)$$

The function given by Eq. (9) is extended periodically with period m. That is $$a_{h+nm} = a_h \quad (10)$$

where $n \in \{0, \pm 1, \pm 2, \ldots\}$, and $a_h$ is called a symmetrical residue of h+nm modulo m.

Let $\bar{a}_m$, be the row vector $[a_0, a_1, \ldots, a_{m-1}]$. For m odd $$\bar{a}_m = \left[0, 1, \ldots, \left\lfloor\frac{m}{2}\right\rfloor, \left\lfloor\frac{m}{2}\right\rfloor, \ldots, 2, 1\right] \quad (11)$$

where $\lfloor x \rfloor$ indicates the greatest integer less than or equal to x. For m even $$\bar{a}_m = \left[0, 1, \ldots, \frac{m}{2}, \frac{m}{2}-1, \ldots, 2, 1\right]. \quad (12)$$

Both have size 1×m and consist of the symmetrical residue elements $a_h$, $0 \leq h < m$. This shows the form of one period of length m. From this definition, it follows for any integers h, k, $a_h = a_{h+k}$ if and only if $h \equiv \pm(h+k) \pmod{m}$.

Theorem 1: Let $m_1, \ldots, m_r$ be r pairwise relatively prime moduli, and let $A_0, A_1, A_2 \ldots$ be vectors formed by the symmetrical number system given in Definition 1.

(a) If one of the moduli ($m_1$) is even, then the dynamic range of the system is $$\hat{M} = \min\left\{\frac{m_1}{2}\prod_{l=2}^{j} m_{i_l} + \prod_{l=j+1}^{r} m_{i_l}\right\} \quad (13)$$

where j ranges from 1 to r−1, and $m_{i1}, m_{i2}, \ldots, m_{ir}$ range over all permutations of $\{2, 3, \ldots, r\}$.

(b) If all of the moduli are odd, then the dynamic range of the system is $$\hat{M} = \min\left\{\frac{1}{2}\prod_{l=1}^{j} m_{i_l} + \frac{1}{2}\prod_{l=j+1}^{r} m_{i_l}\right\} \quad (14)$$

where j ranges from 1 to r−1, and $m_{i2}, m_{i3}, \ldots, m_{ir}$ range over all permutations of $\{1, 2, \ldots, r\}$.

As an example, let $m_1=4$, $m_2=3$, and $m_3=5$. We must minimize the set of values $$\left\{\frac{m_1}{2} + m_2 \cdot m_3, \frac{m_1}{2}m_2 + m_3, \frac{m_1}{2}m_3 + m_2\right\} = \{17, 11, 13\}.$$

The dynamic range is the minimum value of this set, 11, as we verify from Table II. We see that $A_{11}=A_1$, and $A_{11}$ is the first repetitive vector. In other words, $A_0, \ldots, A_{10}$ is a set of 11 distinct vectors, and $A_0, \ldots, A_{11}$ is not a set of distinct vectors. This shows directly that the dynamic range of this system is 11. A repeated vector is called an ambiguity of the system. In the above example, $A_{11}$ is the first ambiguity of the system.

Before starting the proof of Theorem 1, the general idea for the proof is explained. Suppose that $m_1, \ldots, m_r$ are r positive pairwise relatively prime integers. In addition, suppose that $$A_h = \begin{bmatrix} a_h^1 \\ a_h^2 \\ \vdots \\ a_h^r \end{bmatrix} = \begin{bmatrix} a_{h+k}^1 \\ a_{h+k}^2 \\ \vdots \\ a_{h+k}^r \end{bmatrix} = A_{h+k}, \quad (15)$$

so that there is an ambiguity at the position h+k (since the vector is indistinguishable from that at position h), where $h \geq 0$ and $k \geq 1$.

The key to the proof is that fact that $A_h = A_{h+k}$ if and only if $h \equiv \pm(h+k) \pmod{m_i}$ for $1 \leq i \leq r$. Thus, the proof involves systems of linear congruences and the Chinese remainder theorem. The goal is to find the least value of h+k that is an ambiguity. In general, all permutations of subscripts 1, 2, . . . , r must be worked, but for the sake of a clearer presentation, the subscripts are not permuted.

Proof of Theorem 1a: Let $m_1 = 2m$ be even.

Case I:

$$h \equiv (h+k)(\bmod m_i), 1 \leq i \leq j (\leq r) \quad (16)$$

$$h \equiv (h+k)(\bmod m_i), j+1 \leq i \leq r. \quad (17)$$

Case II:

$$h \equiv -(h+k)(\bmod m_i), 1 \leq i \leq j \quad (18)$$

$$h \equiv (h+k)(\bmod m_i), j+1 \leq i \leq r. \quad (19)$$

It is noted that the two cases are opposite in terms of the plus or minus signs in the congruences. These would not be separate cases except for the fact that $m_1$ is the even modulus.

Case I: Suppose congruences (16) and (17) are true, i.e., $k \equiv 0 \pmod{m_i}$ for $1 \leq i \leq j$. Since the moduli are relatively prime in pairs, $$k \equiv 0 \left( \bmod \prod_{i=1}^{j} m_i \right).$$

Note that $k$ is even since $m_1$ is even. It follows that $$k = a \prod_{i=1}^{j} m_i$$

for some $a \in \{1, 2, \ldots\}$ so that $$\frac{k}{2} = am \prod_{i=2}^{j} m_i. \quad (20)$$

Continuing on for the moduli $m_i$, the condition $i \geq j+1$ is examined next. From Eq. (17)

$$h \equiv -\frac{k}{2} (\bmod m_i) \quad (21)$$

for $j+1 \leq i \leq r$. Since these $m_i$ are pairwise relatively prime, the Chinese remainder theorem guarantees that there is a unique solution $$h \left( \bmod \prod_{i=j+1}^{r} m_i \right)$$

to this system. Therefore, there will be exactly $$\prod_{i=1}^{j} m_i$$

solutions $$\left( \bmod \prod_{i=1}^{r} m_i \right).$$

Let $b'$ be the least integer such that $$b' \prod_{i=j+1}^{r} m_i - \frac{k}{2} \geq 0. \quad (22)$$

Note that if we set $$h_1 = b' \prod_{i=j+1}^{r} m_i - \frac{k}{2}, \quad (23)$$

then we have $$0 \leq h_1 < \prod_{i=j+1}^{r} m_i \quad (24)$$

and $$h_1 \equiv -\frac{k}{2} (\bmod m_i) \quad (25)$$

for $j+1 \leq i \leq r$. This $h_1$ is the solution $$\left( \bmod \prod_{i=j+1}^{r} m_i \right).$$

All solutions $$\left( \bmod \prod_{i=1}^{r} m_i \right)$$

are of the form $$h = h_1 + \tilde{b} \prod_{i=j+1}^{r} m_i \quad (26)$$

for $$0 \leq \tilde{b} < \prod_{i=1}^{j} m_i.$$

Using (23), the ambiguities $h+k$ will have the form $$h + k = h_1 + \tilde{b} \prod_{i=j+1}^{r} m_i + k = b' \prod_{i=j+1}^{r} m_i + \tilde{b} \prod_{i=j+1}^{r} m_i + \frac{k}{2}. \quad (27)$$

Using Eq. (20) we have $$h + k = am \prod_{i=2}^{j} m_i + b \prod_{i=j+1}^{r} m_i \quad (28)$$

where $b = b' + \tilde{b} \in \{1, 2, \ldots\}$ and $a \in \{1, 2, \ldots\}$.

Case II: Although the particulars of this case are different from those of Case 1, the line of argument is the same, and the result is exactly the same.

$$h+k = am\prod_{i=2}^{j} m_i + b\prod_{i=j+1}^{r} m_i \quad (29)$$

where a and b are positive integers.

Now, the two cases have been treated, and it is evident that all the ambiguous values h+k have the form of Eqs. (28) or (29), and these forms are indistinguishable. The least number of this form (or the first of many ambiguities) is found by setting a=b=1. Next, it is shown that $$m\prod_{i=2}^{j} m_i + \prod_{i=j+1}^{r} m_i \quad (30)$$

is one of the ambiguities.
Suppose that $$m\prod_{i=2}^{j} m_i < \prod_{i=j+1}^{r} m_i. \quad (31)$$

We revert to Case I, and set a=1 in (20) so that $$\frac{k}{2} = m\prod_{i=2}^{j} m_i. \quad (32)$$

Then, in Eq. (22) b'=1 so that $$h_1 = \prod_{i=j+1}^{r} m_i - \frac{k}{2} \quad (33)$$

and $$h_1 + k = m\prod_{i=2}^{j} m_i + \prod_{i=j+1}^{r} m_i \quad (34)$$

is an ambiguity. That is, the vector corresponding to $h_1$ is the same as the vector corresponding to $h_1+k$.

The alternative is that $$\prod_{i=j+1}^{r} m_i < m\prod_{i=2}^{j} m_i. \quad (35)$$

Now, we use Case II with a=b=1. We can set $$\frac{k}{2} = \prod_{i=j+1}^{r} m_i. \quad (36)$$

Then $$h_1 = m\prod_{i=2}^{j} m_i - \frac{k}{2} \quad (37)$$

is positive, and $$h_1 + k = m\prod_{i=2}^{j} m_i + \prod_{i=j+1}^{r} m_i \quad (38)$$

is an ambiguity.

Recall that $$\begin{bmatrix} a_h^1 \\ a_h^2 \\ \vdots \\ a_h^r \end{bmatrix} = \begin{bmatrix} a_{h+k}^1 \\ a_{h+k}^2 \\ \vdots \\ a_{h+k}^r \end{bmatrix} \quad (39)$$

if and only if $h \equiv \pm(h+k) \pmod{m_i}$, i=1, ..., r. There are $2^n$ possibilities for choice of plus or minus signs in these congruences. For j fixed, we have looked at the two possibilities and found the minimum ambiguity. All others can be found by varying j and by permuting the order of the moduli. Thus $$\hat{M} = \min\left\{ m\prod_{l=2}^{j} m_{i_l} + \prod_{l=j+1}^{r} m_{i_l} \right\} \quad (40)$$

is the minimum ambiguity.

Proof of Theorem 1b: Let $m_1, \ldots, m_r$ be r odd pairwise relatively prime numbers. Recall that $$\begin{bmatrix} a_h^1 \\ a_h^2 \\ \vdots \\ a_h^r \end{bmatrix} = \begin{bmatrix} a_{h+k}^1 \\ a_{h+k}^2 \\ \vdots \\ a_{h+k}^r \end{bmatrix} \quad (41)$$

if and only if $h \equiv \pm(h+k) \pmod{m_i}$ for $1 \leq i \leq r$. Suppose that $h \equiv (h+k) \pmod{m_i}$ for $1 \leq i \leq j$, and $h \equiv -(h+k) \pmod{m_i}$ for $j+1 \leq i \leq r$. The first set of congruences implies that $k \equiv 0 \pmod{m_i}$, $1 \leq i \leq j$. Thus $$k = a\prod_{i=1}^{j} m_i \quad (42)$$

for $a \in \{1, 2, \ldots\}$. The second set of congruences implies that $2h \equiv -k \pmod{m_i}$, i.e.

$$h \equiv \frac{m_i - 1}{2} k \pmod{m_i} \quad (43)$$

for $j+1 \leq i \leq r$. Again, we split the proof into two cases, this time depending on whether k is even or odd.

Case I: Suppose k is even. Then $$h \equiv -\frac{k}{2} \pmod{m_i} \quad (44)$$

for $j+1 \leq i \leq r$. Let $b'$ be the least integer such that $$h_1 = b' \prod_{i=j+1}^{r} m_i - \frac{k}{2} \geq 0. \tag{45}$$

Note that $b' \in \{1, 2, \ldots\}$. This is the unique solution $$\left(\mod \prod_{i=j+1}^{r} m_i\right)$$

to the set congruences of Eq. (44). Every solution to the original problem is of the form $$h = b' \prod_{i=j+1}^{r} m_i + \tilde{b} \prod_{i=j+1}^{r} m_i - \frac{k}{2} \tag{46}$$

where $$0 \leq \tilde{b} \prod_{i=1}^{j} m_i. \tag{47}$$

By Eqs. (42) and (46), all ambiguities $h+k$ that arise from these values of $h$ are of the form $$h + k = \frac{a}{2} \prod_{i=1}^{j} m_i + \frac{b}{2} \prod_{i=j+1}^{r} m_i, \tag{48}$$

where $b=2(b'+\tilde{b})$ is an even positive integer. Note that $k$ is even if and only if $a$ is even.

Case II: Suppose that $k$ is odd. As in Case I, all ambiguities $h+k$ that arise from these values of $h$ are of the form $$h + k = \frac{a}{2} \prod_{i=1}^{j} m_i + \frac{b}{2} \prod_{i=j+1}^{r} m_i \tag{49}$$

where $a$ and $b$ are odd positive integers.

Combining Cases I and II, then we see that the smallest value of (48) and (49) is found when $a=b=1$. Furthermore, when $a=b=1$, and $$\prod_{i=1}^{j} m_i < \prod_{i=j+1}^{r} m_i,$$

this is an ambiguity:

Let $$h = \frac{1}{2} \prod_{i=j+1}^{r} m_i - \frac{1}{2} \prod_{i=1}^{j} m_i \tag{50}$$

with $$k = \prod_{i=1}^{j} m_i.$$

It is easily checked that $h \equiv h+k \pmod{m_i}$ for $1 \leq i \leq j$ and $h \equiv -(h+k) \pmod{m_i}$ for $j+1 \leq i \leq r$. When $$\prod_{i=j+1}^{r} m_i < \prod_{i=1}^{j} m_i,$$

we must solve the permuted problem: $h \equiv h+k \pmod{m_i}$ for $j+1 \leq i \leq r$ and $h \equiv -(h+k) \pmod{m_i}$ for $1 \leq i \leq j$. This time, $$k = \prod_{i=j+1}^{r} m_i, \text{ and } h = (1/2) \prod_{i=1}^{j} m_i - (1/2) \prod_{i=j+1}^{r} m_i$$

give the ambiguity at $h+k$. Since the solution to the problem involves looking at all permutations, this gives the minimum ambiguity. This completes the proof of Theorem 1b.

IV. Resolving the Two-Channel Case

FIG. 3 shows the block diagram of a two-channel receiver architecture to determine a single-frequency $f$. A signal of the frequency $f$ is incident upon an antenna 10 that is connected to an anti-aliasing filter 12. The anti-aliasing filter 12 is a low pass device that filters out frequencies above the frequency $\hat{M}$. The anti-aliasing filter 12 is connected to a pair of channels 14 and 16 that are essentially identical.

The channel 14 includes an ADC 18 that digitizes signals from the anti-aliasing filter 12. The ADC 18 has a sampling frequency $f_{s1}$. The digitized output of the ADC 18 is input to a window function apparatus 20. The window function may be a Hamming window, which reduces the Gibb's oscillations in the waveform. The output of the window function apparatus 20 is input to a DFT apparatus 22. The output of the DFT apparatus 22 is then input to a bin detector apparatus 24. The output of the bin detector apparatus 24 is the frequency bin $a_1$. The channel 16 includes an ADC apparatus 28, a window function apparatus 30, a DFT apparatus 32 and a bin detector apparatus 34 that are preferably identical to the ADC apparatus 18, a window function apparatus 20, a DFT apparatus 22 and a bin detector apparatus 24 that are included in the channel 14. The ADC 28 has a sampling frequency $f_{s2}$. The output of the bin detector 34 is the frequency bin $a_2$. An SNS-to-decimal algorithm is then applied to the numbers $a_1$ and $a_2$.

In this architecture, the time-bandwidth products $m_1 = f_{s1}T_{L1}$ and $m_2 = f_{s2}T_{L2}$ of channel 14 and 16, respectively, are relatively prime. The outputs of the DFT 22 and the DFT 32 are thresholded to detect the frequency bins. The frequency bins $a_1$ and $a_2$ are then used by the SNS-to-decimal algorithm to determine the frequency of the input signal. Let $m_1=f_{s1}T_{L1}$ and $m_2=f_{s2}T_{L2}$, and suppose that the incoming frequency $f$ (unknown) lies within the dynamic range $\hat{M}$ of the SNS system of Eqs. (13) and (14). Thus, $f \equiv \pm a_1 \pmod{m_1}$ and $f \equiv \pm a_2 \pmod{m_2}$. For each of these congruences, either the plus or the minus is correct, but we do not know which. Thus, we have four sets of two equations:

$f \equiv a_1 \pmod{m_1}$ $f \equiv a_2 \pmod{m_2}$ (i)

$f \equiv a_1 \pmod{m_1}$ $f \equiv -a_2 \pmod{m_2}$ (ii)

$f \equiv -a_1 \pmod{m_1}$ $f \equiv -a_2 \pmod{m_2}$ (iii)

$f \equiv -a_1 \pmod{m_1}$ $f \equiv a_2 \pmod{m_2}$ (iv).

The Chinese remainder theorem guarantees that each of these has a unique solution modulo $m_1 m_2$, and Theorem 1 guarantees that exactly one of these solutions lies within the dynamic range of the system, and this is the value of f. In fact, it is only necessary to solve (i) and (ii), at most, because the solutions to (iii) and (iv) are the negatives of the solutions to (i) and (ii), respectively.

Recall that in the standard statement of the Chinese remainder theorem, we wish to solve for f, where $f \equiv a_i \pmod{m_i}$, $1 \leq i \leq r$, and the $m_i$ are pairwise relatively prime. The theorem states that there is a unique solution modulo $M = m_1 m_2 \ldots m_r$. A standard method of solution is to find integers $b_i$ such that $$\frac{M b_i}{m_i} \equiv 1 \pmod{m_i} \quad (51)$$

i=1, 2, . . . , r, in which case, the solution $$f \equiv M b_1 a_1/m_1 + M b_2 a_2/m_2 + \ldots + M b_r a_r/m_r \pmod{M}. \quad (52)$$

Returning to the two-channel case, note that the values of $b_1$ and $b_2$ depend only on $m_1$ and $m_2$ and not at all on $\pm a_1$ or $\pm a_2$. Thus, we may assume that the constants $c_1 = m_2 b_1$ (= $M b_1/m_1$) and $c_2 = m_1 b_2$ are known and that the SNS-to-decimal algorithm only needs to evaluate $\pm c_1 a_1 \pm c_2 a_2$ modulo M (= $m_1 m_2$) and pick the one value that lies within the dynamic range.

For a specific example, consider a two-channel case. Let $m_1 = 330$, and $m_2 = 337$. Then $b_1 = -47$ solves $337 b_1 \equiv 1 \pmod{330}$ (53)

and $b_2 = 48$ solves $330 b_2 \equiv 1 \pmod{337}$. (54)

Thus, $c_1 = m_2 b_1 = -15839$, and $c_2 = m_1 b_2 = 15840$. In addition, M=111,210, and by Theorem 1, the dynamic range of the system is $m_1/2 + m_2 = 502$. These coefficients are hardwired and do not need to be recomputed.

Suppose that the frequency of the incoming signal is f, $0 \leq f \leq 501$, and $a_1 = 59$, and $a_2 = 66$. By Theorem 1, f is the unique solution to $\pm (-15839)(59) \pm (15,840)(66)$ modulo 111,210 that lies in the interval [0,501]. First, try $(-15839)(59) + (15840)(66) = 110939$, which is congruent to $-271$ modulo 111210. Therefore, case (iii) solves f=271. This is the only computation the algorithm needs to compute.

In special cases, there are even quicker solutions than those given above. For example, suppose $m_1 = 2p$ and $m_2 = 2p+1$. By Theorem I, the dynamic range of the system is $m_1/2 + m_2 = 3p+1$. Frequencies within the dynamic range will fall into bins as follows:

$$\underbrace{\begin{bmatrix} 0 \\ 0 \end{bmatrix}\begin{bmatrix} 1 \\ 1 \end{bmatrix} \ldots \begin{bmatrix} p \\ p \end{bmatrix}}_{p+1 \text{ terms}} \underbrace{\begin{bmatrix} p-1 \\ p \end{bmatrix}\begin{bmatrix} p-2 \\ p-1 \end{bmatrix} \ldots \begin{bmatrix} 0 \\ 1 \end{bmatrix}}_{p \text{ terms}} \underbrace{\begin{bmatrix} 1 \\ 0 \end{bmatrix}\begin{bmatrix} 2 \\ 1 \end{bmatrix} \ldots \begin{bmatrix} p \\ p-1 \end{bmatrix}}_{p \text{ terms}}. \quad (55)$$

The top bin represents the sampling frequency of $m_1 = 2p$ and the bottom $m_2 = 2p+1$. Now, suppose the incoming frequency f is resolved into bins $a_1$ and $a_2$, respectively. From the above, it is clear that $$f = \begin{cases} a_1 & \text{if } a_1 = a_2 \\ m_1 - a_1 & \text{if } a_1 = a_2 - 1 \\ m_1 + a_1 & \text{if } a_1 = a_2 + 1 \end{cases} \quad (56)$$

This makes the solution much more straightforward.

V. Resolving the Three-Channel Case

Figure 4:
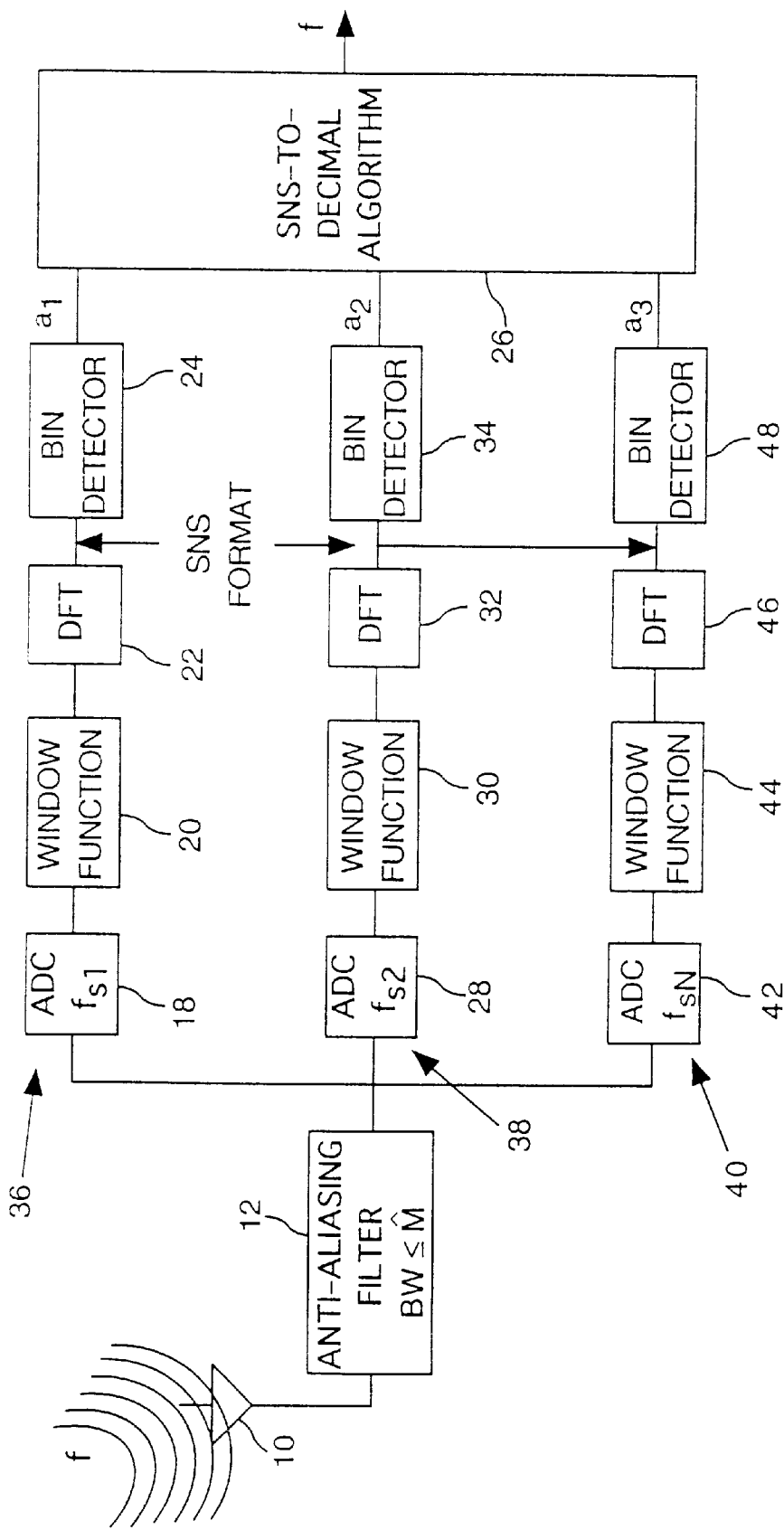
FIG. 4 is a block diagram of an N-channel receiver architecture according to the present invention.

FIG. 4 is a block diagram of an r=3 channel architecture to determine a single frequency. The architecture of FIG. 4 includes a pair of channels 36 and 38 that are identical to the channels 14 and 16 of FIG. 3 plus an additional channel 40 that includes and ADC 42, a window function apparatus 44, a DFT apparatus 46 and a bin detector apparatus 48 that are preferably identical to the ADC apparatus 18, a window function apparatus 20, a DFT apparatus 22 and a bin detector apparatus 24 that are included in the channel 14. The output of the bin detector 34 is the frequency bin $a_3$.

The situation when there are three channels is analogous to the two channel case. Explicitly, suppose that $m_1 = f_{s1} T_{L1}$, $m_2 = f_{s2} T_{L2}$, and $m_3 = f_{s3} T_{L3}$ are pairwise relatively prime. Suppose that the incoming frequency f (unknown) lies within the dynamic range of the system and that it resolves into bins $a_1$, $a_2$ and $a_3$. Now, $f \equiv \pm a_i \pmod{m_i}$, i=1,2,3.

This constitutes eight sets of three equations. By the Chinese remainder theorem, we know that each set of equations has a unique solution modulo $M = m_1 m_2 m_3$, and by Theorem 1, we know that exactly one of these eight solutions lies within the dynamic range of the system. Using the given values of $m_i$, we solve for $b_i$, i=1, 2, 3 using Eq. (51). Let $c_i = M b_i/m_i$, i=1, 2, 3. For emphasis, we repeat that these constants are hardwired into the SNS-to-decimal algorithm. The algorithm must take the bin values $a_1$, $a_2$, and $a_3$ and solve for the unique value of $\pm c_1 a_1 \pm c_2 a_2 \pm c_3 a_3$ modulo $m_1 m_2 m_3$, which lies in the dynamic range $\hat{M}$ of the system.

Example: Form $m_1 = 5, m_2 = 6$, and $m_3 = 7$, we have $b_1 = 3$, $b_2 = -1$, and $b_3 = 4$ so that $c_1 = 126$, $c_2 = -35$, and $c_3 = 120$. If an incoming signal resolves into bins $a_1 = 2$, $a_2 = 2$, and $a_3 = 1$, then the incoming frequency $f \equiv \pm(126)(2) \pm (-35)(2) \pm (120)(1)$ modulo 210 lies in the set of values [0,21]. The algorithm must compute until it finds the value $$f \equiv \pm(126)(2)\pm(-35)(2)\pm(120)(1)(\bmod 210) \quad (57)$$

or $$f \equiv \pm 252 \pm 70 \pm 120 (\bmod 210), \quad (58)$$

but 252 (mod 210)≡42 (mod 210) so that $$f \equiv \pm 42 \pm 70 \pm 120 (\bmod 210). \quad (59)$$

First, try the combination $$f \equiv 42 \pm 70 + 120 \equiv 232 \equiv 22 (\bmod 210) \quad (60)$$

which is a value we can discard because it and its negative are out of the dynamic range.

Second, try the combination $$f \equiv 42 + 70 - 120 \equiv -8 (\bmod 210) \quad (61)$$

Although −8 is out of range, the negative f=8 is in the dynamic range so that f=8 is the correct frequency value.

Figure 5A:
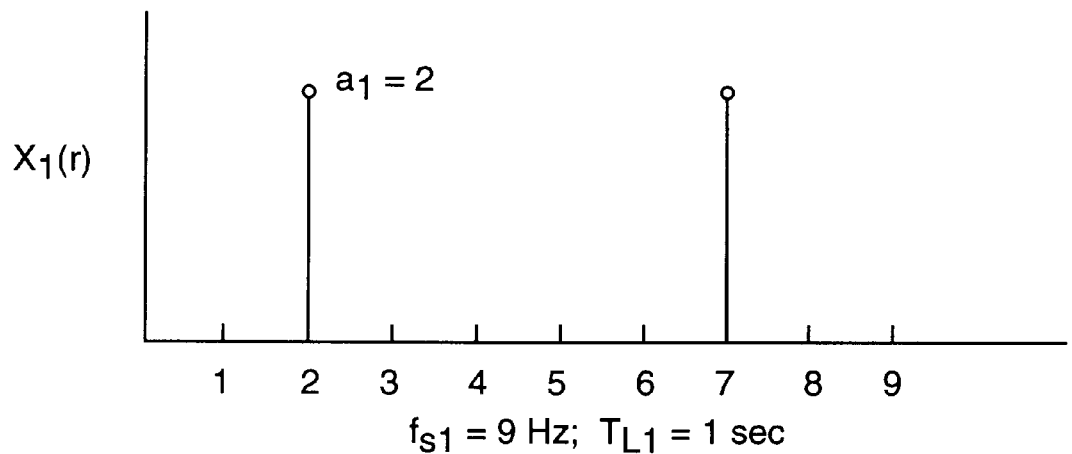
FIGS. 5A–5C illustrate normalized discrete Fourier transform outputs for a three channel receiver architecture according to the present invention.
Figure 5B:
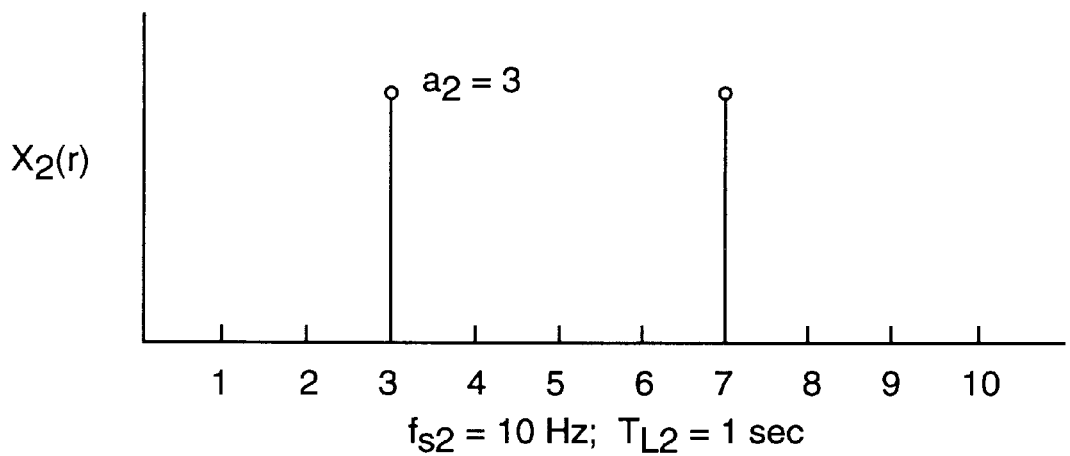
Figure 5C:
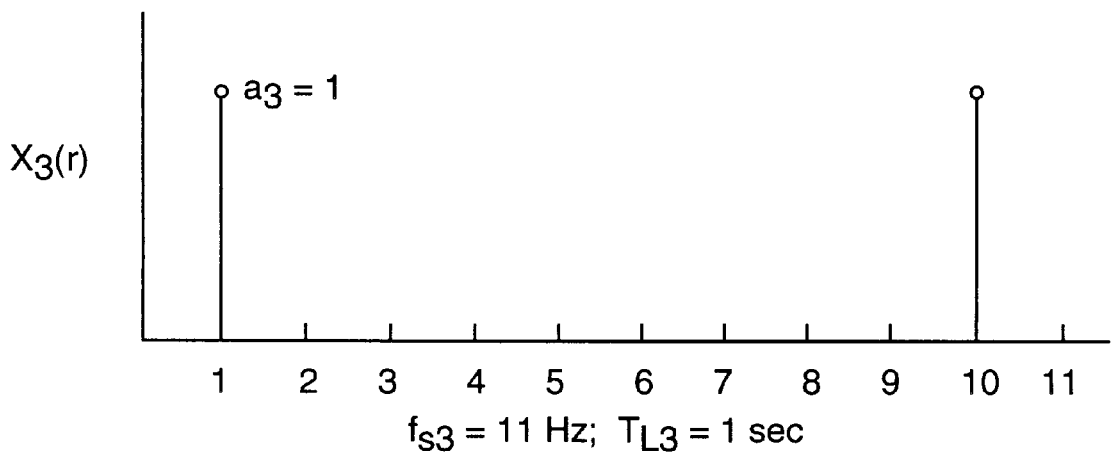

To illustrate the DFT output and the function of the bin detector, an r=3 channel example is illustrated in FIGS. 5A–5C for an input frequency f=43 Hz. In the first channel $f_{s1}=9$ Hz and $T_{L1}=1$ s so that $m_1=9$. The DFT output for the first channel is shown in FIG. 5A, which shows that $a_1=2$. For the second channel $f_{s2}=10$ Hz, and $T_{L2}=1$ s so that $m_2=10$. The DFT output for the second channel is shown in FIG. 5B, which shows that $a_2=3$. For the third channel, $f_{s3}=11$ Hz, and $T_{L3}=1$ s so that $m_3=11$. The DFT output for the third channel is shown in FIG. 5C, which shows that $a_3=1$. Since $m_1$, $m_2$, and $m_3$ are pairwise relatively prime, the dynamic range of the receiver (and the bandwidth of the anti-aliasing filter) is $$\dot{M}=\min\{104,56,64\}=56. \quad (62)$$

Using the SNS-to-decimal algorithm, the frequency is resolved as f=43 Hz according to Eqs. (51) and (52).

Exemplary embodiments of the invention is disclosed herein to explain how to make and use the invention. In actual practice, modifications may be made. The described embodiments are to be considered in all respects as exemplary and illustrative rather than restrictive. Therefore, the appended claims rather than the foregoing descriptions define the scope of the invention. All modifications to the embodiments described herein that come within the meaning and ranges of equivalence of the claims are embraced within the scope of the invention.

TABLE I

Input Frequency and Resulting DFT Bins for Two Channel Example

| Input Frequency | DFT Bins | |
|---|---|---|
| f | $f_s$ = 10 | $f_s$ = 11 |
| 0 | 0 | 0 |
| 1 | 1 | 1 |
| 2 | 2 | 2 |
| 3 | 3 | 3 |
| 4 | 4 | 4 |
| 5 | 5 | 5 |
| 6 | 4 | 5 |

TABLE I-continued

Input Frequency and Resulting DFT Bins for Two Channel Example

| Input Frequency | DFT Bins | |
|---|---|---|
| f | $f_s$ = 10 | $f_s$ = 11 |
| 7 | 3 | 4 |
| 8 | 2 | 3 |
| 9 | 1 | 2 |
| 10 | 0 | 1 |
| 11 | 1 | 0 |
| 12 | 2 | 1 |
| 13 | 3 | 2 |
| 14 | 4 | 3 |
| 15 | 5 | 4 |
| 16 | 4 | 5 |
| 17 | 3 | 5 |
| 18 | 2 | 4 |
| 19 | 1 | 3 |
| 20 | 0 | 2 |
| 21 | 1 | 1 |
| 22 | 2 | 0 |
| 23 | 3 | 1 |

TABLE II

Integer Values for $m_1$ = 4, $m_2$ = 3 and $m_3$ = 5

| | 0 | 1 | 2 | 3 | 4 | 5 | 6 | 7 | 8 | 9 | 10 | 11 | 12 | 13 | ... |
|---|---|---|---|---|---|---|---|---|---|---|---|---|---|---|---|
| $m_1$ | 0 | 1 | 2 | 1 | 0 | 1 | 2 | 1 | 0 | 1 | 2 | 1 | 0 | 1 | ... |
| $m_2$ | 0 | 1 | 1 | 0 | 1 | 1 | 0 | 1 | 1 | 0 | 1 | 1 | 0 | 1 | ... |
| $m_3$ | 0 | 1 | 2 | 2 | 1 | 0 | 1 | 2 | 2 | 1 | 0 | 1 | 2 | 2 | ... |

What is claimed is:

1. A method for digitally processing a signal derived from an analog waveform of frequency f, comprising the steps of:

receiving the analog waveform with a receiving antenna to produce an analog signal indicative of the amplitude and frequency of the analog waveform;

processing the analog signal in a plurality of r parallel digital processing channels each arranged to digitize the analog signal at a corresponding sampling frequency $f_{si}$ to produce a plurality of digital signals;

applying a discrete Fourier transform to directly utilize the relationship of the discrete Fourier transform (DFT) and the symmetrical number system (SNS) to resolve frequency aliases $f > f_{si}/2$ (ambiguities due to undersampling a real signal) that occur within a plurality of r parallel ADC-DFT channels where after sampling, the DFT in each channel naturally encodes the frequency information of the signal in $m_i$ indices (number of samples within the DFT) that are pairwise relatively prime, $$\left[0, 1 \ldots, \frac{m_i}{2}, \frac{m_i}{2}-1, \ldots, 2, 1\right]$$

for $m_i$ even, and $$\left[0, 1 \ldots, \left[\frac{m_i}{2}\right], \left[\frac{m_i}{2}\right], \ldots, 2, 1\right]$$

for $m_i$ odd, and this is a format that is in the same form as the SNS so that the indices within each channel containing the detected frequency $a_1, a_2, a_3, \ldots a_r$ are used to evaluate the original (single) frequency, detecting the frequency bin ($a_i$) within each discrete Fourier transform output;

processing the bin numbers $a_i(i=1, 2, \ldots, r)$ to resolve the single frequency ambiguity;

setting $M = m_1, m_2, m_3, \ldots, m_r$;

evaluating $$f \equiv (a_1)Mb_1/m_1 \pm (a_2)Mb_2/m_2 \pm (a_3)Mb_3/m_3 \pm \ldots (a_r)Mb_r/m_r \bmod(M)$$

where $b_i$ is such that $$\frac{Mb_i}{m_i} = 1 \bmod(m_i); \quad \text{and}$$

picking the one value that lies within the dynamic range $\hat{M}$ of the SNS where $$\hat{M} = \min\left\{ \frac{m_l}{2} \prod_{l=2}^{j} m_{i_l} + \prod_{l=j+1}^{r} m_{i_l} \right\}$$

when $m_1$ is even and where $j$ ranges from 2 to $r-1$ and $i_2, i_3, \ldots, i_r$ range over all permutations of $(2, 3, \ldots, r)$.

$$\hat{M} = \min\left\{ \frac{1}{2} \prod_{l=1}^{j} m_{i_l} + \frac{1}{2} \prod_{l=j+1}^{r} m_{i_l} \right\}$$

when all of the $m_i$s are odd and where $j$ ranges from 1 to $r-1$ and $i_1, i_2, \ldots, i_r$ range over all permutations of $(1, 2, \ldots, r)$.

2. The method of claim 1, further including the step of applying a low-pass filter to the analog waveform before the analog waveform is processed by the plurality of parallel digital processing channels.

3. The method of claim 2 wherein the step of processing the analog signal in a plurality of parallel digital processing channels includes the step of digitizing the analog signal with a plurality of analog-to-digital converters each having a corresponding sampling frequency $f_{si}$.

4. The method of claim 3 including the step of applying a window function to signals output from the plurality of analog-to-digital converters to reduce the Gibb's oscillations in the signals.

5. The method of claim 1 wherein the discrete Fourier transform for each channel is a discrete transformation of a plurality of $m_i$ time-domain samples of a waveform $x(n)$ to a sequence of $m_i$ frequency domain coefficients defined by $$X_i(k) = \sum_{n=0}^{m_i-1} x(n) e^{-j(2\pi n k / m_i)} \quad k = 0, \ldots, m_i - 1$$

and where $|X_i(k)|^2$ is the energy contained in the signal at each digital frequency $\omega = 2\pi k/m_i$.

6. The method of claim 5 including the steps of:

selecting sampling frequencies and discrete Fourier transform integration times such that the time-bandwidth products $m_i = (f_{si})(T_{Li})$ for the plurality of digital channels is a set of pairwise relatively prime numbers.

* * * * *